United States Patent [19]

Drabing

[11] Patent Number: 4,713,740
[45] Date of Patent: Dec. 15, 1987

[54] SWITCH-MODE POWER SUPPLY
[75] Inventor: Richard B. Drabing, Los Altos, Calif.
[73] Assignee: SMS Advanced Power, Inc., Cupertino, Calif.
[21] Appl. No.: 634,882
[22] Filed: Jul. 27, 1984
[51] Int. Cl.[4] .................................................. H02M 3/335
[52] U.S. Cl. ........................................ 363/17; 363/98; 363/49; 323/901
[58] Field of Search ............ 363/17, 24, 25, 26, 363/55, 56, 49, 98, 133, 134, 132; 323/269, 272, 901, 902

[56] References Cited

U.S. PATENT DOCUMENTS

| | | | |
|---|---|---|---|
| 3,304,489 | 2/1967 | Brolin et al. | 323/9 |
| 3,361,955 | 1/1968 | Typke | 323/22 |
| 3,377,540 | 4/1968 | Meyer | 321/11 |
| 3,378,758 | 4/1968 | Goodenow | 323/18 |
| 3,443,195 | 5/1969 | Hoffman, Jr. et al. | 363/20 |
| 3,559,040 | 1/1971 | Fickenscher | 323/22 |
| 3,579,090 | 5/1971 | Madsen | 323/22 |
| 3,600,666 | 8/1971 | Gliever | 323/22 T |
| 3,641,424 | 2/1972 | Kuykendall | 323/38 |
| 3,660,750 | 5/1972 | Businelli | 321/2 |
| 3,702,434 | 11/1972 | Ryan | 323/20 |
| 3,838,329 | 9/1974 | Michelet et al. | 307/240 |
| 3,975,672 | 8/1976 | Lachocki | 323/17 |
| 3,983,418 | 9/1976 | Wallace | 307/270 |
| 3,986,052 | 10/1976 | Hunter | 307/270 |
| 4,001,663 | 1/1977 | Bray | 323/21 |
| 4,030,024 | 6/1977 | Chambers et al. | 323/17 |
| 4,060,758 | 11/1977 | Wright | 363/89 |
| 4,087,850 | 5/1978 | Koizumi | 363/21 |
| 4,092,708 | 5/1978 | Gerding et al. | 363/56 |
| 4,129,791 | 12/1978 | Sato | 307/252 Q |
| 4,150,424 | 4/1979 | Nuechterlein | 363/26 |
| 4,160,945 | 7/1979 | Schorr | 323/17 |
| 4,164,014 | 8/1979 | Crow et al. | 363/49 |
| 4,209,826 | 6/1980 | Priegnitz | 363/21 |
| 4,228,493 | 10/1980 | de Sartre et al. | 363/56 |
| 4,233,557 | 11/1980 | Alberkrack | 263/20 |
| 4,246,634 | 1/1981 | Purol | 363/49 |
| 4,288,831 | 9/1981 | Dolickian | 363/26 |
| 4,308,576 | 12/1981 | Clark, Jr. | 363/56 |
| 4,308,577 | 12/1981 | Mentler | 363/134 |
| 4,322,785 | 3/1982 | Walker | 363/21 |
| 4,323,961 | 4/1982 | Josephson | 363/56 |
| 4,342,076 | 7/1982 | Rosswurm | 363/56 |
| 4,342,956 | 8/1982 | Archer | 323/289 |
| 4,352,153 | 9/1982 | Voyer | 363/56 |
| 4,378,585 | 3/1983 | Bete | 363/19 |
| 4,400,767 | 8/1983 | Fenter | 363/49 |

FOREIGN PATENT DOCUMENTS

| | | | |
|---|---|---|---|
| 56-31369 | 3/1981 | Japan | 363/21 |
| 186992 | 11/1982 | Japan | 363/134 |
| 603070 | 4/1978 | U.S.S.R. | 363/24 |
| 651329 | 3/1979 | U.S.S.R. | 363/49 |
| 853758 | 8/1981 | U.S.S.R. | 363/24 |

Primary Examiner—Peter S. Wong
Assistant Examiner—Judson H. Jones
Attorney, Agent, or Firm—Cushman, Darby & Cushman

[57] ABSTRACT

A switch-mode power supply has first and second switching transistors connected in series together and in parallel with the primary of a power transformer which alternately connect the primary winding of the power transformer across a DC potential. The bases of the switching transistors are each connected to a separate secondary winding of a control transformer the primary of which receives a control signal. Simultaneous conductance of the switching transistors is prevented. A control circuit providing the control signal is powered initially from charge derived from the power supply primary circuit and stored on a capacitor. A Schmitt trigger connects the capacitor to power the control circuit when the voltage across the capacitor rises to above a first predetermined level. Once the power supply begins to operate, semi-regulated power from the secondary circuit of the supply is connected via the Schmitt trigger to power the control circuit output. Current limiting is provided to reduce the duty cycle of the switching transistors when an overcurrent occurs. When the voltage applied to power the control circuit falls below a second predetermined level, the Schmitt trigger disconnects the control circuit from the capacitor to shut down the power supply. The control circuit restarts automatically, providing a "burp mode" of operation. Supply output voltage is monitored by a comparator which is connected to the control circuit through an opto-coupler operated in a digital mode to provide high primary-to-second circuit isolation without requiring special circuit compensation.

12 Claims, 4 Drawing Figures

SWITCH-MODE POWER SUPPLY

FIELD OF THE INVENTION

The present invention is related to the conversion of an alternating current to a voltage regulated direct current voltage. In particular, the present invention is related to switch-mode power supplies, which switch an unregulated DC voltage in accordance with a control signal in order to regulate the switched voltage. The present invention is also related to controlling a plurality of switching elements so that they do not conduct simultaneously. The present invention is further related to sampling the output of a power supply while providing high isolation of the output circuit from other power supply circuits.

BACKGROUND OF THE INVENTION

Modern electronic semiconductor components typically require relatively low DC voltages to operate. Of course, residential power lines provide relatively high voltage alternating current. Commonly, the alternating current provided by conventional power lines is connected to a transformer in order to step down (or up) the voltage to a desired level. The transformer output is then rectified, filtered and regulated to produce the direct current voltages required by solid-state electronic equipment.

As performance requirements for electronic circuitry have become more stringent and the operating tolerances of certain high-precision electronic components have narrowed, it has become critical to provide highly accurate voltage regulation of rectified and filtered power supply voltages. Voltage fluctuations in the voltages produced by unregulated DC power supplies can be attributed to a number of sources, including power line voltage variations, heating of power supply components, variations in load current, etc. Because nearly all semiconductor devices operate best at a constant power supply voltage (some devices will be destroyed upon the occurrence of even small power supply over-voltages and will fail to operate or operate unreliably upon the occurrence of small undervoltages), and will produce far more accurate outputs when operated under constant supply voltages, nearly all modern semiconductor power supplies provide some sort of voltage regulation.

Many techniques exist for voltage regulating a direct current voltage. For instance, a simple voltage regulator may comprise nothing more than a Zener diode and a series-connected resistor. Monolithic voltage regulators are presently commercially available which provide highly accurate voltage regulation at relatively low cost. When used in conjunction with pass transistors, these monolithic voltage regulators can regulate very high current DC voltage sources from output voltage fluctuations. Unfortunately, many effective voltage regulating schemes achieve voltage regulation at the expense of efficiency. Series-type voltage regulators often produce relatively high power losses in achieving good voltage regulation. Moreover, such voltage regulators typically provide voltage regulation for over only a narrow range of output voltage set points.

Switching regulators are used when it is necessary or desirable to minimize power losses which would otherwise occur in series voltage regulators or when large variations in input voltages or output currents may be likely to occur. Switch-mode power supplies are thus generally regarded as the most efficient of regulated power supplies because they are capable of achieving excellent output voltage regulation with little wasted power over a wide range of input voltages and output currents. Switch-mode power supplies typically comprise an unregulated, relatively high-voltage DC power supply, one or more switching elements, an output transformer, output rectifying and filtering components, and a control circuit. The unregulated DC voltage is selectively applied to the output transformer via the switching element or elements. The output of the output transformer is rectified and filtered to produce a DC output voltage. The output voltage level is measured and used to pulse-width modulate the control signal, which controls the switching duty cycle of the switching elements. The output voltage may be increased by turning the switching elements on for a greater proportion of the total time, and may be decreased (down to zero, if necessary) by decreasing the duty cycle of the switching elements. Using this arrangement, little power is dissipated in heating the components responsible for regulating the voltage.

Efficiency of the supply depends mainly upon the switching and saturation losses of the switching elements. A number of techniques have been proposed for increasing the switching speeds of switch-mode power supply switching elements, thereby increasing the overall efficiency of the supply. See, for example, the following prior-issued U.S. Pat. Nos.:

4,342,956—Archer—Aug. 3, 1982
4,322,785—Walker—Mar. 30, 1982
4,308,577—Mentler—Dec. 29, 1981
4,060,758—Wright—Nov. 29, 1977
3,986,052—Hunter—Oct. 12, 1976
3,983,418—Wallace—Sept. 28, 1976
3,975,672—Lachocki—Aug. 17, 1976
3,838,329—Michelet et al—Sept. 24, 1974
3,641,424—Kuykendall—Feb. 8, 1972
3,600,666—Gliever—Aug. 17, 1971
3,579,090—Madsen—May 18, 1971
3,559,040—Fickenscher—Jan. 26, 1971
3,378,758—Goodenow—Apr. 16, 1968
3,304,489—Brolin et al—Feb. 14, 1967
3,361,955—Typke—Jan. 2, 1968

As is well known, switching transistors are not capable of instantaneously switching on upon the application of an input signal due to "storage time" effects. When a bipolar junction transistor is off, its base charge is nominally zero. When it is turned on, some finite time must elapse to allow charged distributions within the various layers to become established. Negative charges are provided by electrons crossing the emitter junction, while positive charges are furnished by base current. If the transistor is driven into saturation (which is normally desired in switching applications in order to turn it fully on and therefore reduce the voltage drop across it), an excess minority-carrier charge is accumulated comprising a uniform saturation charge (which makes no contribution to the current flow) and another charge which creates the density gradient necessary to sustain current flow by diffusion across the base. Thus, when the transistor is driven on, its collector current will not attain its final value until both the excess accumulated charge and the charge which establishes the density gradient have been established. On the other hand, a transistor which is on and in saturation cannot be turned off until both stored charges have been removed. During the interval when the saturation charge is being removed, the transistor collector current will not diminish; collector current will only begin to fall off as the charge establishing the density gradient begins to dissipate. See Taub, H. and Schilling, D., *Digital Integrated Electronics*, 44–49 (McGraw-Hill 1977).

Hence, a high-speed model of a bipolar junction transistor contains a capacitance shunted across its base which limits the switching speed of the device. In addition, lead wire connections (which connect the device leads to the transistor structure layers) have associated with them small amounts of resistance. The connection resistance of the transistor base lead to the base layer limits the amount of current which can instantaneously flow in or out of the base lead of the device, further limiting the device switching speed (since it limits the speed which the storage charge can be applied or removed). The delays in switching of the transistor caused by the combined effects of saturation charge and lead wire resistance (i.e. the delay between the time when base current is applied to the transistor to the time when the collector current reaches maximum value, and the time delay between the time when the base current begins to be removed from the base of the transistor to the time when collector current is reduced to zero) is called "storage time."

The effects of time delays associated with switching transistor storage time are especially critical in switch-mode power supplies utilizing a pair of switching transistors connected in series across a center-tapped unregulated DC source. Such power supplies operate by alternately connecting the primary winding of the output transformer between the center tap and the positive lead of the DC source and between the center tap and the negative lead. Minimum voltage output is, of course, achieved by reducing the duty cycle (ratio of transistor on time to off time) of the switching elements to approximately zero. Maximum voltage output is achieved by increasing the duty cycle of each of the switching elements to approximately 50%. It will be understood that if the duty cycles of the switching elements exceed 50%, the switching elements will be placed in series directly across the full output of the DC source, causing them to self-destruct due to overcurrent. It is therefore essential that both switching elements not be turned on simultaneously.

Due to storage time of the transistors, accurate and predictable control of the on and off times of each transistor is generally impossible to achieve. For this reason, prior art power supplies are designed with "dead time," i.e. a period is provided during each half cycle wherein neither transistor is on. See, for example, U.S. Pat. Nos. 4,342,076 to Rosswurm et al (issued July 27, 1982); 4,150,424 to Nuechterlein (issued Apr. 17, 1979); and 4,087,850 to Koizumi (issued May 2, 1978). Unfortunately, dead time limits the maximum duty cycle of each switching transistor to well below 50%. Such schemes must usually further limit maximum duty cycle in order to compensate for variations in the switching speeds of different transistors. Therefore, such prior art power supplies undesirably limit the range of voltage regulation capable of being provided. An alternative solution is to use switching transistors with matched switching characteristics. However, this solution is expensive (since it requires more expensive components) and makes component replacement a difficult task. Other solutions have been proposed; see, for example, U.S. Pat. No. 4,308,576 to Clark, Jr. (issued Dec. 29, 1981), which teaches using the interaction between two halves of center-tapped primary windings of the power transformer of a switch-mode power supply and series-connected switching transistors to force the transistors into nonconductance when an overcurrent occurs.

Yet another disadvantage associated with prior art switch-mode power supplies is the requirement of a separate internal power supply used to power the control circuitry. Active devices are used for sampling the supply output voltage and for producing the control signals necessary to switch the switching elements on and off. These active control devices, of course, require power of their own to operate. Many prior art switch-mode power supplies provide a separate DC power supply solely for powering the control circuitry. See, for example, U.S. Pat. No. 4,160,945 to Schorr (issued July 10, 1979). See also U.S. Pat. No. 4,030,024 to Chambers et al (issued June 14, 1977), which discloses a preregulator power supply for the control and drive circuits of the power supply which permits direct coupling to the power switching regulator device without requiring isolating devices. U.S. Pat. No. 3,702,434 to Ryan (issued Nov. 7, 1972) proposes to utilize a voltage-dropping resistor and a capacitor to reduce the voltage of the unregulated DC source of a switch-mode power supply (which typically produces a relatively high voltage, perhaps several hundred volts) to a voltage level suitable for powering the active control circuitry of the supply. This solution is relatively inefficient, however, because the unregulated source voltage level must be reduced substantially, requiring the dissipation of substantial amounts of power in the voltage dropping resistor as heat. The resulting power supply is larger in physical size, runs hotter and is more inefficient.

A better way of providing power to the control circuitry of a switch-mode power supply is to use the regulated output of the supply itself to supply voltages to the control circuitry. This is a deceptively simple solution, however, as it will be realized upon reflection that the control circuitry of a switch-mode power supply must operate to initially turn on the switching transistors before the supply can provide any output. Undaunted by this complication, prior art designers have proposed various ways to initiate switching of the switching transistors until the supply begins to generate an output voltage (which is then used to power the control circuits). See, for example, U.S. Pat. No. 4,323,961 to Josephson (issued Apr. 6, 1982) (primary circuit bleeder resistor voltages initiate switching of switching transistors; a second secondary winding of the output power transformer provides power to control circuitry thereafter); U.S. Pat. Nos. 4,246,634 to Purol (issued Jan. 20, 1981); 3,660,750 to Businelli (issued May 2, 1972); and 4,164,014 to Crowe et al (issued Aug. 7, 1979).

A very desirable feature in a switch-mode power supply is the so-called "burp mode" of operation, which is essentially a current limiting shut-down feature with automatic restart. When excessive current is drawn from the output of the power supply, a current limiting circuit senses the excessive current level and cuts back the output voltage of the supply (typically to nearly zero volts), thereby effectively shutting down the power supply in order to prevent damage to the power supply components (such as the switching transistors) from overcurrent. Some power supplies require a manual reset by a user once overcurrent shut-down has occurred (see, for example, U.S. Pat. No. 3,377,540 to Meyer issued Apr. 9, 1968); while this is desirable for some applications, it is generally not suitable for applications where an operator does not constantly monitor the operation of the device powered by the supply. For these more automatic applications, an automatic restart feature has been developed wherein the power supply shuts itself down upon the occurrence of an overcurrent, and subsequently, after a time, restarts itself automatically. If the overcurrent condition still exists, the power supply once again shuts down, and subsequently restarts. This process may continue indefinitey without damage to any of the power supply components. "Burp mode" is descriptive terminology for this type of current limiting feature. The following prior-issued U.S. patents disclose power supplies with a "burp mode" feature:

U.S. Pat. No. 4,092,708 to Gerding et al (issued May 30, 1978); and

U.S. Pat. No. 4,288,831 to Dolickian (issued Sept. 8, 1981).

Unfortunately, relatively complex circuitry is normally required to achieve this very desirable power supply behavior.

Another problem ordinarily associated with switch-mode power supplies is providing sufficient isolation between the power supply output and power supply primary circuits. Many safety regulations and safety standards require extremely high DC isolation between the output terminals of a power supply and power supply internal high voltage potentials. Power supplies must be designed to physically isolate secondary circuits from primary circuits in order to ensure that high voltage potentials can never reach the power supply output to harm users or damage load components. In order to achieve high DC isolation between power supply primary and secondary circuitry, the prior art has made extensive use of conventional opto-coupler coupling devices. An opto-coupler is a light emitting diode optically coupled to a light-sensitive transistor such that the transistor conductance is dependent upon the LED output luminance. No electrical or physical connection between the input and the output of the opto-coupler is necessary, so that extremely high input-to-output DC isolation is obtained. The following references disclose the use of an opto-coupler to achieve DC isolation between the output and primary circuits of a power supply:

U.S. Pat. No. 4,233,557 to Alberkrack (issued Nov. 11, 1980);

U.S. Pat. No. 4,378,585 to Bete (issued Mar. 29, 1983);

U.S. Pat. No. 4,228,493 to de Sartre et al (issued Oct. 14, 1980);

U.S. Pat. No. 4,209,826 to Priegni tz (issued June 24, 1980);

U.S. Pat. No. 4,129,791 to Sato (issued Dec. 12, 1978); and

U.S. Pat. No. 4,001,663 to Bray (issued Jan. 4, 1977).

In the prior art, the analog voltage level of the output of the power supply is monitored to control switch-mode voltage regulators. In the prior art, opto-couplers are typically connected in an analog mode in such applications (i.e. the power supply output voltage varies the intensity of the LED, which in turn varies the conductance of the light-sensitive transistor through a range). Unfortunately, it is generally necessary to provide compensation in order to account for variations in the gain of the particular opto-coupler unit used, since the gain of such devices can vary substantially from one unit to another. Unless some way of "tweaking" or otherwise compensating each power supply control circuit for the particular gain of the opto-coupler is provided, inaccurate regulation or poor or unstable closed loop response may result.

Many complex and sophisticated power supply functions can be provided by a switch-mode power supply controlled by a digital controller. U.S. Pat. No. 4,352,153 to Voyer (issued Sept. 28, 1982) discloses a power supply including a digital controller which automatically corrects for imbalance in the operation of the switching transistors. Unfortunately, the expense of digital controllers such as microprocessors is relatively high, and justifiable only for extremely critical applications. Generally, it is more cost-effective to use discrete components (in combination with monolithic power supply chips, which are common, widely available and relatively inexpensive) to achieve sophisticated power supply control features whenever possible.

SUMMARY OF THE INVENTION

In accordance with one aspect of the present invention, means are provided for preventing first and second switching elements from conducting simultaneously. An alternating current control signal is produced. A first inductor inductively coupled to the control signal controls the first switching element in accordance with the control signal. A second inductor inductively coupled to the control signal controls a second switching element in accordance with the inverse of the control signal. The first and second inductors are inductively coupled together to prevent the first and second switching elements from conducting simultaneously. A third inductor, adapted to receive the control signal, preferably inductively couples the control signal to the first and second inductors. Means are preferably provided for limiting the current flowing through the third inductor. Means comprising a simple resistor-capacitor network are preferably provided for applying a negative bias to the signal induced in the first and second inductors to increase switching speed.

Thus, a simple base drive arrangement for the switching transistors of a switch-mode power supply is provided by the present invention. No built-in dead time is required because the switchingtransistors cannot be turned on simultaneously due to the mutual inductance of the inductors used to couple control signals to the transistors. Transistors with unmatched storage times are forced to more equal balance because the inventive driving arrangement cannot support unequal driving outputs. The switching transistors are prevented from destruction or damage which might result from simultaneous conduction, yet may operate at very high duty cycles approaching 50%.

In accordance with another aspect of the present invention, a regulated power supply includes a power output circuit which produces a voltage having a level which varies in response to a control signal. A comparator compares a reference level to the level of the power output circuit, and produces a signal when the produced level exceeds the reference level. A control signal producing circuit produces the control signal having a level which is dependent on the signal produced by the comparator. An opto-coupler couples the signal produced by the comparator to the control signal producing circuit. The opto-coupler preferably produces a signal when the comparator produces a signal and does not produce a signal when the signal produced by the comparator is not present. The control signal producing circuit preferably produces a periodic control signal having a pulse width which decreases when the opto-coupler produces a signal and increases when the opto-coupler does not produce a signal.

Hence, the present invention provides high DC isolation between the output and primary circuits of a power supply utilizing an off-the-shelf opto-coupler without the problems normally associated with non-uniform gain between different opto-coupler units. Correct compensation of the feedback circuit in accordance with the present invention for proper servo response requires only simple arrangements which will accomodate any opto-coupler unit without additonal adjustment. Thus, there is no need to "tweak" power supply units for the particular opto-coupler unit which is used.

In accordance with yet another feature of the present invention, a power supply includes a circuit for producing an unregulated signal and an active regulating circuit for regulating the unregulated signal. The active regulating circuit includes a power input terminal adapted to provide power to the regulating circuit. A resistor draws current from the unregulated signal producing circuit. A current storing device, connected to both the resistor and to the output of the regulating circuit, stores the current drawn from the unregulated signal producing circuit and current produced by the regulating circuit. A switching device supplies the current stored in the current storing device to the power input terminal of the regulating circuit when the voltage across the current storing device exceeds a first predetermined level. The switching device preferably comprises a Schmitt trigger which connects the power input terminal to the current storing device when the voltage appearing across the current storing device exceeds a first predetermined level and disconnects the power input terminal from the current storing device when the voltage appearing across the current storing device is less than a second predetermined level (which is less than the first predetermined level). The Schmitt trigger preferably includes a pass switching device, connected between the charge storing device and the input terminal, which connects the charge storing device to the power input terminal when a voltage less than the voltage across the charge storing device is applied to a control lead. A voltage divider connected across the pass switching device produces a voltage which is inversely proportional to the difference between the voltage across the charge storing device and the voltage applied to the power input terminal. A reference level is produced which is less than the level produced by the unregulated signal producing circuit. A control transistor connects the reference level to the control lead of the pass switching device when the voltage produced by the voltage divider exceeds the reference level.

In this way, a simple start circuit arrangement initially provides operating power to the control circuitry of a switch-mode power supply temporarily before the power supply produces a regulated output, and then permits the control circuitry to be powered from the output of the power supply. The start circuit is highly efficient, wasting almost no power (thus making the overall power supply more power-efficient and permitting reduction in power supply size). Additionally, the start circuit in accordance with the present invention provides a current-limiting "burp mode" protective feature without requiring a complex control structure.

BRIEF DESCRIPTION OF THE DRAWINGS

These and other objects and advantages of this invention will be better and more completely understood by reading the following detailed description of an exemplarly embodiment in conjunction with the accompanying drawings, of which.

DETAILED DESCRIPTION OF THE PREFERRED EMBODIMENT

Figure 1:
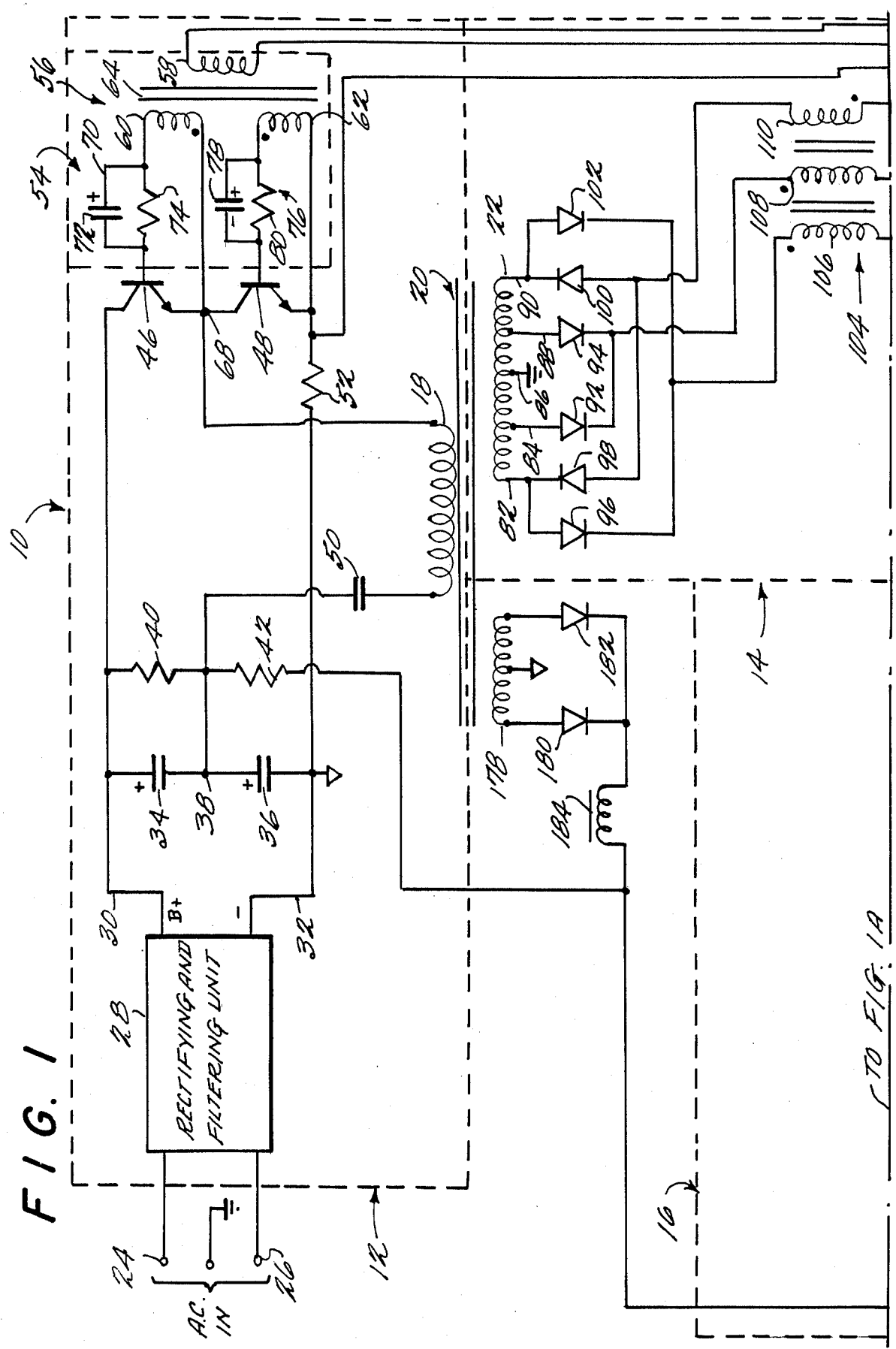
FIGS. 1 and 1(A) are schematic diagrams of the presently preferred exemplary embodiment of the present invention.
Figure 1A:
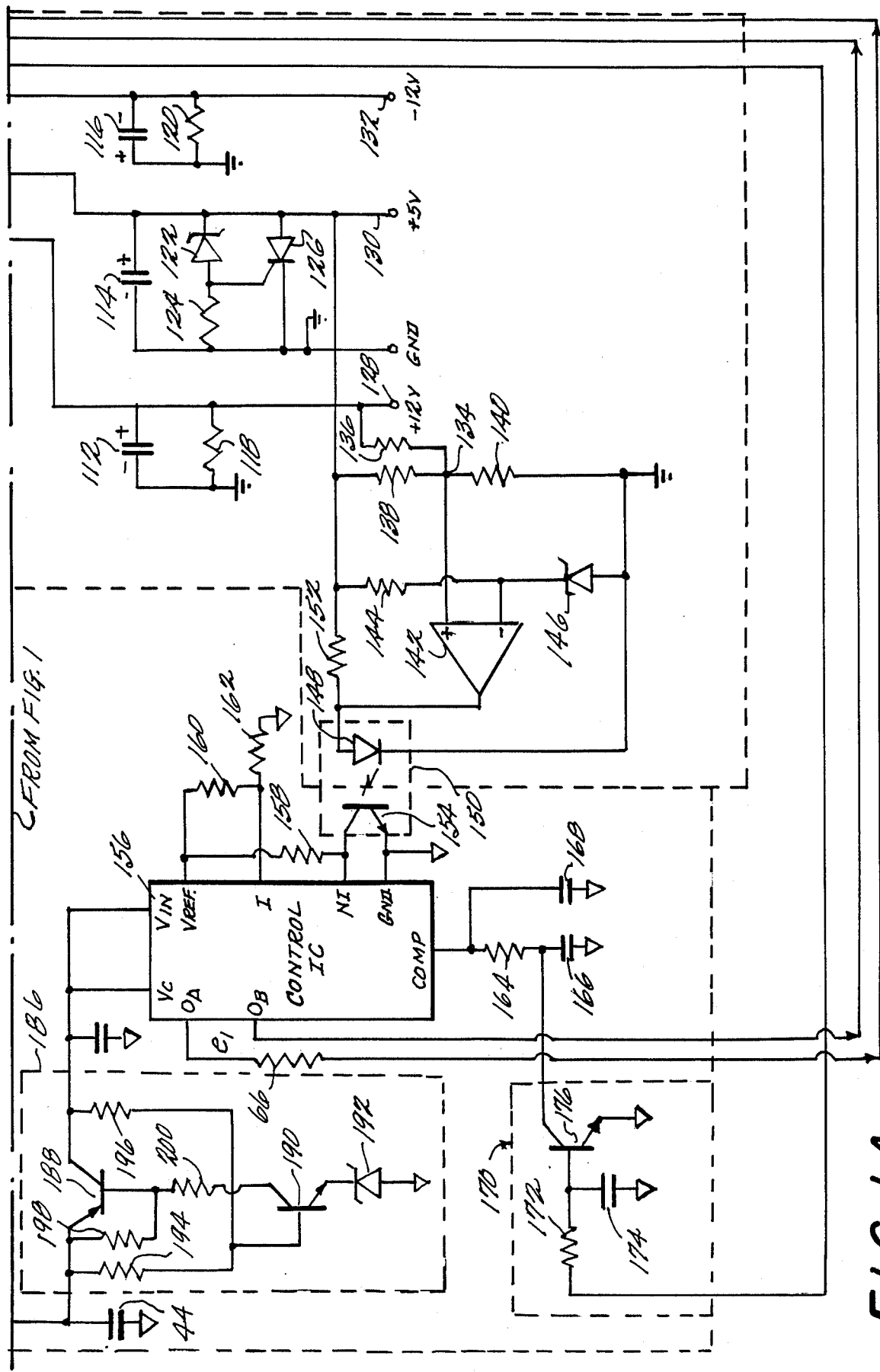

FIGS. 1 and 1(A) together are a detailed schematic diagram of the presently preferred exemplary embodiment of a switch-mode power supply 10 in accordance with the present invention. Switch-mode power supply 10 may be considered as being divided into three main parts: a primary circuit 12, a secondary circuit 14 and a control circuit 16. Primary circuit 12 provides relatively high-voltage direct current to the primary winding 18 of an output transformer 20. Secondary circuit 14 rectifies and filters the resulting alternating current signal appearing on a secondary winding 22 of output transformer 20, thereby producing the DC output voltages of supply 10. Control circuit 16 monitors the level of the voltages produced by secondary circuit 14 and controls the amount of current applied by primary circuit 12 to primary winding 18, thereby regulating the output voltages produced by supply 10.

PRIMARY CIRCUIT

A conventional alternating current line voltage (e.g. 115 volts, 60 cycles) is connected to input terminals 24 and 26 of power supply 10. It will, of course, be understood that any conveniently-available alternating current source or voltage could be used. Input terminals 24 and 26 are connected to a conventional rectifying and filtering unit 28 which isolates power supply 10 from the AC line and rectifies and filters the AC line voltage to provide a DC voltage B+ across terminals 30 and 32.

Rectifying and filtering unit 28 can, of course, include well-known transient suppression devices and networks and current surge limiting circuits in order to protect power supply 10 from noise and transients which may appear on input terminals 24 and 26. In the preferred embodiment, rectifying and filtering unit 28 produces a DC voltage of approximately 300 volts across terminals 30 and 32.

Terminals 30 and 32 are connected to series-connected filter capacitors 34 and 36 configured in a well-known "half bridge" arrangement. Capacitors 34 and 36 perform dual functions: they filter the DC output of rectifying and filtering unit 28 (thereby removing variations in the DC voltage); and they provide an intermediate (center-tapped) DC output terminal 38. Thus, approximately one-half of the output voltage B+ appears at terminal 38 (the junction between series-connected capacitors 34 and 36). It will be well understood by those skilled in the art that other arrangements providing a center-tapped output could be alternatively used (such as employing a voltage doubler circuit).

A bleeder resistor 40 is connected across filter capacitor 34. One end of another bleeder resistor 42 is connected to terminal 38, while the other end of the bleeder resistor is connected to a grounded capacitor 44. The function of capacitor 44 will be described in greater detail later. Bleeder resistors 40 and 42 discharge filter capacitors 34 and 36 when supply 10 is turned off, thereby removing dangerous high-voltage potentials from the supply. As will be discussed, bleeder resistor 42 also provides power to control circuit 16 when supply 10 is initially powered on.

As will be understood, terminal 32 is at relative ground potential (approximately 0 volts DC) while supply 10 is in operation, terminal 30 is at approximately 300 volts DC, and center-tapped terminal 38 is at approximately 150 volts DC. It may thus be said that terminal 30 is approximately 150 volts (one-half B+) above terminal 38, while terminal 32 is approximately 150 volts (one-half B+) below terminal 38. Switching transistors 46 and 48 alternately connect primary winding 18 of output transformer 20 across terminals 30 and 38 and across terminals 38 and 32.

One end of primary winding 18 is connected to a DC blocking capacitor 50, which presents DC potentials from being placed directly across the winding. The other end of DC blocking capacitor 50 is connected to terminal 38. The other end of primary winding 18 is connected to junction point 68, the connection between the emitter of switching transistor 46 and the collector of switching transistor 48 (transistors 46 and 48 are connected in series). The collector of switching transistor 46 is connected to terminal 30. The emitter of switching transistor 48 is connected to one end of a resistor 52, the other end of which is connected to terminal 32 (i.e. ground potential). A voltage is developed across resistor 52 (which has a relatively low resistance value of approximately 1 ohm in the preferred embodiment) which is proportional to the current flowing through primary winding 18. Control circuit 16 monitors the voltage across resistor 52 to provide current limiting control during overcurrent conditions, as will be explained later.

As will be understood, when switching transistor 46 is turned on, primary winding 18 is connected between terminals 30 and 38, placing a potential of +150 volts across the winding. When switching transistor 48 is turned on, primary winding 18 is connected across terminals 38 and 32, placing a potential of approximately −150 volts across the winding. By varying the time during which switching transistors 46 and 48 alternately conduct (i.e. duty cycle), the amount of current flowing through primary winding 18 can be controlled. If switching transistors 46 and 48 each conduct for a relatively low percentage of the time, the current flowing through primary winding 18 will be relatively low, and therefore, the voltage induced across secondary winding 22 will be relatively low. As the duty cycle of switching transistors 46 and 48 increases to approximately 50%, the current flowing through primary winding 18 will be at a maximum, and the voltage induced across secondary winding 22 will be at a maximum. By controlling the duty cycles of switching transistors 46 and 48, the output voltages produced by secondary circuit 14 may therefore be regulated.

If switching transistors 46 and 48 conduct simultaneously, they will complete a circuit between terminals 30 and 32 of rectifying and filtering unit 28 so that a very high DC potential will appear directly across them. If such a condition were allowed to occur, the switching transistors would instantly be destroyed due to overcurrent. Base drive circuit 54 assures that transistors 46 and 48 can never conduct simultaneously.

Figure 2:
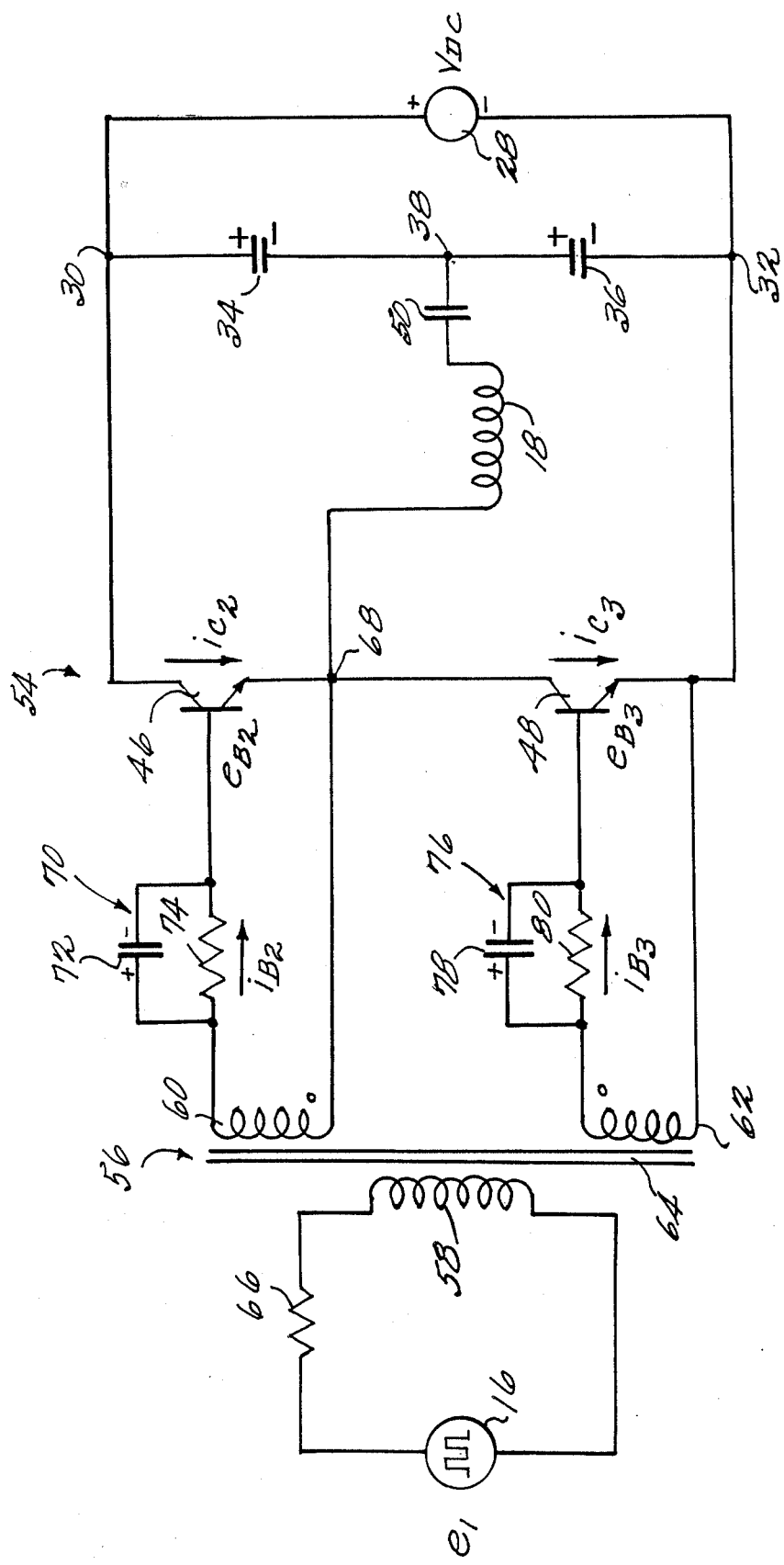
FIG. 2 is a simplified schematic diagram of the base driving circuit for the switching transistors in accordance with the present invention.
Figure 3:
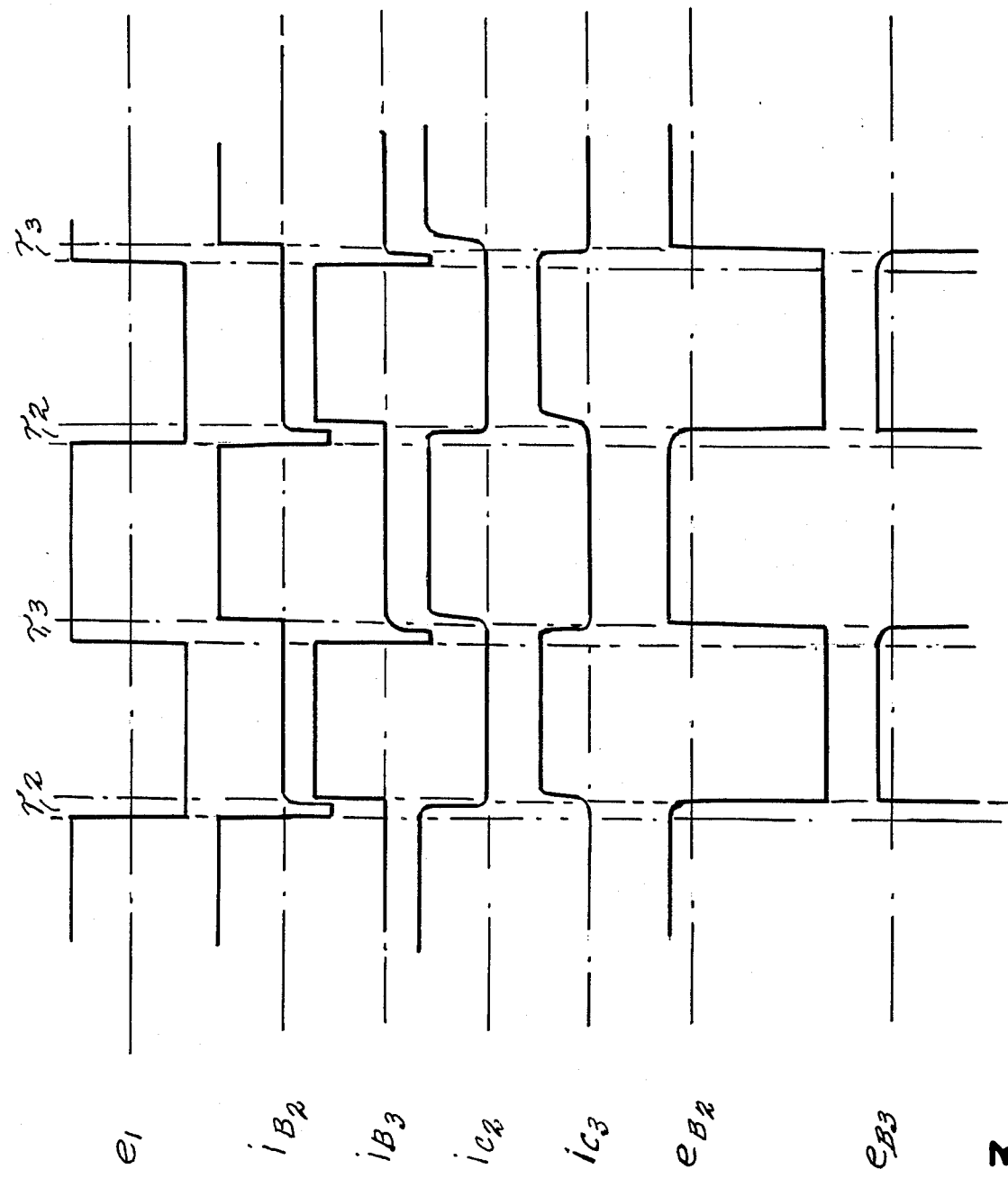
FIG. 3 is a waveform timing diagram of the circuit shown in FIG. 2.

Base drive 54 may be better understood by referring to FIGS. 2 and 3. A control transformer 56 is provided to couple a control signal produced by control circuit 16 to the bases of switching transistors 46 and 48. Control transformer 56 includes a primary winding 58, a first secondary winding 60 and a second secondary winding 62. A toroidal core 64 tightly inductively couples primary winding 58 to first secondary winding 60 and second secondary winding 62 (while the preferred embodiment uses a toroidal core, any other suitable core construction could be used instead). Primary winding 58 is connected through a current limiting resistor 66 (the purpose of which will become apparent shortly) to the control signal $e_1$ produced by control circuit 16. Control signal $e_1$ is preferably a periodic square wave signal having a duty cycle which can be varied from between 0% to 50%. A graphical illustration of control signal $e_1$ having a duty cycle of approximately 50% can be seen in FIG. 3.

Due to the respective orientations of first secondary winding 60 and second secondary winding 62 with respect to primary winding 58, a positive voltage is induced across first secondary winding 60 when control signal $e_1$ goes positive, while a positive voltage is induced across second secondary winding 62 when control signal $e_1$ goes negative (i.e. the inverse of the control signal is induced across second secondary winding 62).

One end of first secondary winding 60 is connected to the junction point 68 which connects the emitter of switching transistor 46 to the collector of switching transistor 48. The other end of first secondary winding 60 is connected to the base of switching transistor 46 through a biasing network 70 consisting of a capacitor 72 and a resistor 74 connected in parallel. A current $i_{B2}$ flows through network 70 and into the base of transistor 46; a voltage $e_{B2}$ is applied to the base of transistor 46. Similarly, one end of second secondary winding 62 is connected to the emitter of switching transistor 48. The other end of second secondary winding 62 is connected to the base of switching transistor 48 through a biasing network 76 consisting of a capacitor 78 and a resistor 80 connected in parallel. A current $i_{B3}$ flows through biasing network 76 into the base of switching transistor 48, and a voltage $e_{B3}$ is applied to the base of the transistor.

Core 64 provides mutual, close coupling between first secondary winding 60 and second secondary winding 62. Likewise, primary winding 58 is closely coupled to both secondary windings 60 and 62. Provided that the current flowing through primary winding 58 is kept below a predetermined level, the voltage across the primary winding and the voltages across first secondary winding 60 and second secondary winding 62 will all be constrained to have the same polarity by the effects of mutual inductance. In other words, it will not be possible for the voltages across, for instance, primary winding 58 and second secondary winding 62 to reverse in polarity unless the voltage across first secondary winding 60 also reverses in polarity.

When a positive pulse is applied by control circuit 16 to primary winding 58, a positive voltage is induced across first secondary winding 60. A current $i_{B2}$ flows into the base of switching transistor 46 and a positive voltage $e_{B2}$ is applied to the base. As was explained earlier, a saturation charge must build up in the base of the switching transistor 46 before the transistor will turn on. Once enough charge has accumulated in the base of switching transistor 46, the transistor saturates and conducts collector current $i_{C2}$; current flows from terminal 30 through the switching transistor, primary winding 18 of power transformer 20 and blocking capacitor 50 back to terminal 38.

When the positive pulse of control signal $e_1$ ends and the potential of $e_1$ falls to a negative value, the direction of current flowing through primary winding 58 will tend to reverse, as will the direction of the currents flowing through secondary windings 60 and 62. Thus, current $-i_{B2}$ will begin to flow out of the base of switching transistor 46. However, before the voltage $e_{B2}$ on the base of switching transistor 46 may change from a positive to a negative value, the stored charge in the base of the switching transistor must be removed. Hence, the voltage across first secondary winding 60 cannot reverse in polarity until the accumulated saturation charge in the base of switching transistor 46 has flowed out of the base of the transistor. Transistor 46 will begin to turn off after the stored saturation charge has been dissipated and the charge which is responsible for establishing a density gradient across the base begins to dissipate. The time which it takes for the stored charge to completely flow out of the base of switching transistor 46 (thereby completely turning off the transistor) is shown graphically in FIG. 3 as $\tau_2$.

Current limiting resistor 66 (which in the preferred embodiment has a value of approximately 33 ohms) limits the magnitude of current flowing through primary winding 58 so that, in conjunction with the close inductive coupling between windings 58, 60 and 62, it is not possible to induce a positive voltage across secondary winding 62 while a positive voltage still is applied across secondary winding 60 by the storage charge of switching transistor 46. Thus, $i_{B3}$ cannot begin to flow into the base of switching transistor 48 until $i_{B2}$ has reached a 0 value after flowing in a negative direction for a period of time $\tau_2$ sufficient to drain all of the stored charge from the base of switching transistor 46. When this occurs, the voltage across first secondary winding 60 goes negative, the voltage across primary winding 58 also goes negative, and a positive voltage is induced across second secondary winding 62. Current $i_{B3}$ flows into the base of switching transistor 48, a positive voltage $e_{B3}$ is applied on base of the transistor and transistor 48 eventually turns on.

When control signal $e_1$ again rises to a positive value, the effect already described will once again occur. The stored saturation charge accumulated in the base of switching transistor 48 must be drawn out of the transistor (shown in $\tau$FIG. 3 as occurring during a period $\tau_3$) before a positive voltage may be induced across first secondary winding 60 to turn transistor 46 on once again.

In this way, transistors 46 and 48 can never turn on simultaneously. It is always necessary for the stored charge accumulated in the base of the last transistor turned on to be removed before the other transistor can turn on. This is true even where transistors 46 and 48 have different storage times (i.e. $\tau_2$ does not equal $\tau_3$). Therefore, the switching operations of transistors 46 and 48 are forced to more equal balance because transformer 64 cannot support unequal volt-seconds on its two secondary windings 60 and 62. Indeed, core 64 of transistor 56 may saturate during an extended storage time, thus forcing the slowest one of transistors 46 and 48 to an earlier turn-off.

No dead time is required since the storage times of the switching transistors 46 and 48 automatically limit the maximum duty cycles of the transistors. A control signal $e_1$ having a 50% duty cycle may safely be applied to primary winding 58 without any danger of simultaneously turning on switching transistors 46 and 48. It should be pointed out that the value and presence of current limiting resistor 66 is critical to the operation of this circuit arrangement, since voltages of different polarities could exist on second windings 60 and 62 if a sufficient amount of current is permitted to flow through primary winding 58. Of course, those skilled in the art could readily devise other ways of providing current limiting for primary winding 58 so that the circuit will function as described.

While unnecessary to make base drive circuit 54 function as described, biasing networks 70 and 76 force transistors 46 and 48 to turn off faster (thus shortening times $\tau_2$ and $\tau_3$) by applying negative bias voltages to the base of each of the transistors. As can be seen from FIG. 3, $i_{B2}$ and $i_{B3}$ each have a positive average value, which causes an average positive voltage drop across each of resistors 74 and 80 over time. Capacitor 72 and 78 accordingly each charge such that they apply a negative voltage to the bases of transistors 46 and 48, respectively. The values of the components of biasing networks 70 and 76 are chosen so that $e_{B2}$ and $e_{B3}$ each have an average value of approximately $-4$ volts in the preferred embodiment. Thus, for instance, when control circuit 16 applies a positive pulse to primary winding 58, $e_{B2}$ will rise to a level only slightly above the diode drop across the base-emitter junction of transistor 46 (i.e., to slightly above 0.7 volts in the preferred embodiment), and $e_{B3}$ goes rather negative (to about $-8.7$ volts in the preferred embodiment). $e_{B3}$ pulls the base of transistor 48 way down, thereby more quickly discharging the accumulated charge in the base of the transistor and achieving faster turn-off time.

Of course, the use of biasing networks 70 and 76 requires that slightly more drive voltage must be provided across secondary windings 60 and 62 in order to control transistors 46 and 48. The turns ratio of control transformer 56, and the values of capacitors 72 and 78 and of resistors 74 and 80 should all be carefully chosen to provide proper drive current and voltage levels for switching transistors 46 and 48 (as will be appreciated by those skilled in the art). The result is an increase in overall efficiency because most of the power dissipated by switching transistors 46 and 48 is dissipated during the time that the transistors are switching between the on state and the off state. Moreover, reduction in the delays associated with dead times also results, permitting higher maximum duty cycles for the switching transistors and resulting increases in voltage regulation range.

SECONDARY CIRCUIT

Secondary winding 22 of power transformer 20 is provided with a plurality of taps 82-90 in order to source a plurality of different voltages. A center tap 86 is connected to ground potential. The ground potential of secondary circuit 14 is not the same ground potential as the one used for primary circuit 12 and control circuit 16. These two ground potentials are electrically isolated from one another and, in some applications, may be at entirely different voltage levels. A different ground for secondary circuit 14 isolated from the ground used by primary circuits 12 and control circuit 16 is used to achieve secondary-to-primary circuit isolation. Rectifiers 92 and 94 are connected to taps 84 and 88, respectively, and form a conventional full-wave rectifier circuit. Rectifiers 96, 98, 100 and 102 are connected to outer taps 82 and 90 in a full-wave bridge rectifier configuration, thus producing symmetrical positive and negative rectified voltages.

A common mode inductor 104 provides inductive filtering for each of the three rectified voltages provided by secondary winding 22. A first winding 106 of common mode inductor 104 is connected to rectifiers 96 and 102 (which provide a positive 12 volt potential in the preferred embodiment), a second winding 108 is connected to rectifiers 92 and 94 (which provide a positive 5 volt potential in the preferred embodiment).and a third winding 110 is connected to rectifiers 98 and 100 (which provide a negative 12 volt potential in the preferred embodiment). Each of the outputs of windings 106, 108 and 110 are conventionally capacitively filtered by capacitors 112, 114 and 116, respectively. A blender resistor 118 is provided in parallel with capacitor 112 and a bleeder resistor 120 is provided in parallel with capacitor 116 to provide minimal current when the outputs of the supply are unloaded. A Zener diode 122 is connected in series with a resistor 124 across capacitor 114. An SCR 126 is also connected across capacitor 114 with its gate connected to the junction between resistor 124 and 122. Zener diode 122, resistor 124 and SCR 126 in combination provide overvoltage protection for the low voltage positive output of secondary circuit 14. In the preferred embodiment, three different voltage outputs (+12 VDC, +5 VDC, and −12 VDC) are provided at output terminals 128, 130 and 132, respectively.

Output terminal 128 is connected to a summing node 134 through a resistor 136, while output terminal 130 is connected to summing node 134 through a resistor 138. A resistor 140 is connected between summing node 134 and ground potential. The voltage level at summing node 134 is indicative of the voltage output of secondary circuit 14. Summing node 134 is connected to the non-inverting input of a conventional comparator 142 (a LM393 in the preferred embodiment). One end of a resistor 144 is connected to output terminal 130, while the other end of the resistor is connected to a lead of a Zener diode 146. The other lead of Zener diode 146 is connected to ground. The junction of resistor 144 and Zener diode 146 is connected to the inverting input of comparator 142 to provide a reference voltage input to the inverting input. The output of comparator 142 is connected to one lead of the light emitting diode 148 of a conventional opto-coupler 150. Any conventional opto-coupler can be used for opto-coupler 150 (for instance, a MOC602A). The other lead of LED 148 is connected to ground. The lead of LED 148 connected to comparator 142 is also connected to output terminal 130 through a resistor 152, through which power to turn on the LED is provided.

When the voltage level appearing at summing node 134 is less than the reference voltage across Zener diode 146 applied to the non-inverting input of comparator 142, a logic level 0 output will be produced by the comparator. Comparator 142 pulls down resistor 152 to ground potential, and light emitting diode 148 will remain off. However, when the voltages at output terminals 128 and 130 rise to a sufficient level so that the voltage level at summing node 134 exceeds the voltage across Zener diode 146, comparator 142 generates a logic level 1 output, turning on light emitting diode 148. In this way, light emitting diode 148 is on when the output voltages at output terminals 128-132 exceed a predetermined level (set by the breakdown voltage of Zener diode 146 and the values of resistors 136-140), and is off when the output voltages are less than this predetermined level.

CONTROL CIRCUIT

The emitter of light-sensitive transistor 54 of opto-coupler 150 is connected to primary ground potential, while its collector is connected to the non-inverting input of a conventional monolithic switch-mode power supply control integrated circuit 156 (such as a SG3525A, available from a number of different commercial manufacturers). Extremely high voltage isolation is provided between LED 148 and transistor 154 of opto-coupler 150. The non-inverting input NI of integrated circuit 156 is connected to a reference voltage (preferably the reference voltage output $V_{ref}$ produced by the integrated circuit itself) through a resistor 158. The inverting input I of integrated circuit 156 is connected to a voltage divider consisting of series-connected resistors 160 and 162. Resistor 160 is connected between the reference voltage available at the $V_{ref}$ output of integrated circuit 156 and the inverting input of the integrated circuit, while resistor 162 is connected between the inverting input of the integrated circuit and ground (i.e. the same ground as that of the primary circuit 12 and a different ground than that used by the secondary circuit 14).

When transistor 154 is off, the non-inverting input of integrated circuit 156 is pulled up through resistor 158 to approximately the level of $V_{ref}$. Transistor 154 conducts current when light emitting diode 148 turns on, pulling down the non-inverting input NI of integrated circuit 156 to below the potential of the I input. The value of resistor 158 is selected so that transistor 154 will not saturate when turned on to achieve better speed performance and resulting faster closed loop response. The values of resistors 160 and 162 are selected according to the value of $V_{ref}$ to apply a suitable voltage level to the inverting input of integrated circuit 156 so that the integrated circuit can distinguish whether transistor 154 is on or off.

A comparator circuit internal to integrated circuit 156 is connected to the inverting and non-inverting inputs of the integrated circuit, and acts as charge pump to pump current in or out of a "COMP" terminal of the integrated circuit. A resistor 164 in series with a capacitor 166 (the other side of which is connected to ground potential) is connected to the COMP terminal of integrated circuit 156 in parallel with another capacitor 168 (the other side of which is connected to ground potential). Capacitors 166 and 168 store the charge produced at the COMP output of integrated circuit 156. Integrated circuit 156 pumps charge in and out of capacitors 166 and 168 as a function of the relative voltage levels applied to the non-inverting inverting and inverting inputs of the integrated circuit (which are, in turn, dependent upon whether light emitting diode 148 is on or off).

When light emitting diode 148 is on (indicating that the output voltages produced by secondary circuit 14 are higher than a predetermined level), integrated circuit 156 pumps charge out of capacitors 166 and 168, thereby reducing the voltage across these capacitors. Likewise, whenever light emitting diode 148 is off (indicating that the voltages produced by secondary circuit 14 are lower than a predetermined level), integrated circuit 156 pumps charge through its COMP terminal into capacitors 166 and 168, thereby increasing the voltage across these capacitors.

Integrated circuit 156 in the preferred embodiment has two totem-pole outputs ($O_A$ and $O_B$) which apply control signal $e_1$ (discussed previously) to primary winding 58 of control transformer 56. Control signal $e_1$ is produced by integrated circuit 156. The pulse width of control signal $e_1$ is modulated in accordance with the voltage applied to the COMP input of integrated circuit 156 (for instance, the pulse width of control signal $e_1$ increases from 0% duty cycle to 50% duty cycle in the preferred embodiment as the voltage applied to the COMP input by capacitors 166 and 168 increases from approximately 1 volt to approximately 3½ volts). In this way, the duty cycles of switching transistors 46 and 48 are controlled as an inverse function of the level of output voltages produced by secondary circuit 14. The value of capacitors 166 and 168 and the value of resistor 164 are selected to achieve proper loop response so that fluctuations in the voltages produced by secondary circuit 14 are compensated for quickly with minimum overshoot. Proper closed loop servo response compensation is performed by simply limiting the slew rate of the COMP pin of integrated circuit 156 and providing lead compensation, taking into account the performance characteristics of the integrated circuit. Gain variations in opto-coupler 150 have no effect on circuit performance, since the opto-coupler is either on or off (i.e. operates in a digital mode). Level uncertainty problems are eliminated, and high loop stability and performance is achieved.

A current limiting network 170 comprising a resistor 172, a capacitor 174 and a transistor 176 is connected to the junction between resistor 164 and capacitor 166. Resistor 52 (connected in series between the emitter of switching transistor 48 and terminal 32 of rectifying and filtering unit 28), it will be recalled, produces across it a voltage proportional to the current flowing through primary winding 18 of power transformer 20. If a load connected to output terminals 128, 130 or 132 draws an excessive amount of current, the voltage produced across resistor 52 will rise to above a predetermined level. This voltage is applied through resistor 172 to the base of transistor 176. Capacitor 174 is connected between the base of transistor 176 and ground to provide a time constant to prevent short-lived overcurrents and noise spikes from causing current limiting to occur. Transistor 176 is connected across capacitor 166 so that when the transistor turns on, it discharges capacitor 166. The pulse width of control signal $e_1$ is reduced when capacitor 166 discharges, reducing the voltages produced by second circuit 14 in a manner independent of the voltage regulation function of control circuit 16. In this way, switching transistors 46 and 48 as well as the components of secondary circuit 14 are protected against overcurrents. The values of resistors 52 and 172 and capacitor 174 are selected to set the amount of current which can flow through switching transistor 48 before current limiting will begin to occur.

It will be understood that integrated circuit 156 is an active device and therefore requires a power source in order to operate. A second secondary winding 178 of power transformer 20 which is also inductively coupled to primary winding 18) is connected to rectifiers 180 and 182 in a full wave bridge rectifier configuration. The output of rectifiers 181 and 182 are connected via a choke 184 to capacitor 44. A Schmitt trigger circuit 186 selectively connects the voltage across capacitor 44 to the power input terminal $V_{in}$ and $V_c$ of integrated circuit 156. When switching transistor 46 and 48 are properly operating to cause current to flow through primary winding 18 of power transformer 20, a semi-regulated rectified and filtered voltage of a proper level is produced by the combination of secondary winding 178, rectifiers 180 and 182, choke 184 and capacitor 44 (which acts as a filter capacitor). This semi-regulated voltage is applied to terminal $V_{in}$ through Schmitt trigger 186 in order to provide power for integrated circuit 156.

Of course, upon initial start-up of power supply 10, switching transistors 46 and 48 must have base excitation applied to them before current will be applied to primary winding 18. Power input terminal $V_{in}$ of integrated circuit 156 must have power applied to it before switching transistors 46 and 48 can obtain base excitation. Integrated circuit 156 initially obtains power from an alternate source (the current flowing through bleeder resistor 42 of primary circuit 12) upon initial start-up of supply 10. When line voltage is initially applied to terminals 24 and 26, rectifying and filtering unit 28 produces DC potential at its terminals 30 and 32. Capacitors 34 and 36 charge, and voltage is applied across bleeder resistors 40 and 42. The resistances of bleeder resistors 40 and 42 are relatively high in order to reduce size of the resistors and the amount of heat which must be dissipated by the resistors and to increase the overall efficiency of power supply 10. In the preferred embodiment, bleeder resistors 40 and 42 are approximately 100 kilohms each. A small amount of current (on the order of 1 milliampere) flows through bleeder resistor 42 and into capacitor 44. A charge builds up on capacitor 44 from the current flowing through bleeder resistor 42. When the voltage across capacitor 44 reaches a predetermined level (approximately 15 volts in the preferred embodiment), Schmitt trigger 186 connects capacitor 44 to input terminal $V_{in}$ of integrated circuit 156, applying power to the integrated circuit. Integrated circuit 156 is provided with power until it discharges capacitor 44 (integrated circuit 156 draws much more than 1 mA of current) to the extent that the voltage across the capacitor falls below a second predetermined level (approximately 5 volts in the preferred embodiment). At this time, Schmitt trigger 186 disconnects capacitor 44 from input terminal $V_{in}$ for reasons which will become apparent shortly.

Integrated circuit 156 is thus powered for a short time upon start-up of power supply 10 on the charge stored by capacitor 44. The internal oscillator of integrated circuit 156 begins to function, and a control signal $e_1$ is produced across totem-pole outputs $O_A$ and $O_B$ and applied to primary winding 58 of control transformer 56 as earlier described. Switching transistors 46 and 48 begin to conduct, thereby applying current to primary winding 18 of power transformers 20. Voltage induced across secondary winding 178 is rectified and used to power integrated circuit 156. In this way, control circuit 16 is provided with power from the unregulated DC voltage produced by primary circuit 12 for an initial period upon powering of power supply 10 on, and is subsequently powered by the semi-regulated output voltage produced by secondary winding 178 once the power supply begins to operate.

If current limiting circuit 170 senses an overcurrent condition, the voltage across primary winding 18 of power transformer 20 is reduced (due to the decreased duty cycle of control signal $e_1$). If enough current limiting cut-back in the voltage across primary winding 18 takes place, the voltage applied to capacitor 44 from secondary winding 178 (which will have a reduced voltage applied across it as the voltage across primary winding 18 is reduced) falls to a level below the second predetermined level at which Schmitt trigger 186 will continue to conduct. Schmitt trigger 186 disconnects capacitor 44 from input terminal $V_{in}$ of integrated circuit 156, and control circuit 16 shuts down. Of course, the output voltage produced by secondary circuit 14 will drop to 0 at this time. However, current flowing through bleeder resistor 42 begins to recharge capacitor 44. When the voltage across capacitor 44 reaches the first predetermined level, Schmitt trigger 186 connects the capacitor to power terminal $V_{in}$ of integrated circuit 156, and control circuit 16 starts up again. If the condition causing an overcurrent continues to exist, this start-up and shut-down mode of operation will continue periodically indefinitely (resulting in a "burp mode" of operation) without damage to any power supply component.

Schmitt trigger 186 in the preferred embodiment comprises a pass transistor 188, a control transistor 190, a Zener diode 192, a voltage divider comprising resistors 194 and 196, and resistors 198 and 200. The emitter of pass transistor 188 is connected to capacitor 44, while the collector of the pass transistor is connected to power input terminal $V_{in}$ of integrated circuit 156. One end of resistor 194 is also connected to capacitor 44, while the other end is connected to resistor 196. The other end of resistor 196 is connected to the collector of pass transitor 188. The voltage divider comprised of resistors 194 and 196 is effectively placed across pass transistor 188, and the voltage appearing at the junction between resistors 194 and 196 varies proportionately with the voltage across pass transistor 188. When pass transistor 188 is off, its collector is at nearly DC ground potential while its emitter is at the potential of the voltage across capacitor 44. Therefore, the junction of resistors 194 and 196 rises to a level of a predetermined fraction of the voltage level across capacitor 44 (as determined by the relative values of resistors 194 and 196). In the preferred embodiment, the values of resistors 194 and 196 are chosen so that the voltage at their junction is approximately one-third of the voltage across capacitor 44.

The junction of resistors 194 and 196 is connected to the base of control transistor 190. The emitter of control transistor 190 is connected to ground through Zener diode 192, while the collector of the control transistor is connected to the base of pass transistor 188 through a resistor 200. Another resistor 198 connects resistor 200 to capacitor 44 to apply potential to the collector of control transistor 190. The Zener diode 192 in the preferred embodiment has a breakdown voltage of approximately 5.6 volts. Before control transistor 190 will conduct, its base must be raised to a potential of approximately one diode drop above the breakdown voltage of Zener diode 192. If no current flows through control transistor 190, pass transistor 188 has no base current supplied to it and will remain off.

As the voltage across capacitor 44 increases, a potential greater than the breakdown voltage of Zener diode 192 plus one diode drop will eventually appear on the base of control transistor 190 (this occurs in the preferred embodiment when the voltage across capacitor 44 rises to slightly above 15 volts). Transistor 190 turns on and begins drawing current through resistor 200. Current is drawn from the base of pass transistor 188, and the pass transistor begins to turn on. As this occurs, collector current begins to flow through pass transistor 188, raising power input terminal $V_{in}$ above ground. The junction of resistors 194 and 196 begins to rise above ground, applying more base current to control transistor 190 and therefore turning the transistor on very hard. Both control transistor 190 and past transistor 188 turn on very rapidly as a result and remain on.

Pass transistor 188 will only turn off again if the base of control transistor 190 drops to a value which is lower than the voltage across Zener diode 192 plus one diode drop. In order for this conditon to occur in the preferred embodiment, the voltage across capacitor 44 must drop down to below approximately 6.2 volts in the preferred embodiment. When this occurs, transistor 190 turns off, the base of pass transistor 188 no longer has base drive, and pass transistor 188 turns off. In this way, Schmitt trigger 186 exhibits hysteresis of a predetermined amount. It will, of course, be understood that any circuit arrangement exhibiting this hysteresis effect would be suitable, and the present invention is not intended to be limited to.any one such arrangement.

Although only one exemplary embodiment has been described in detail above, those skilled in the art will appreciate that many variations and modifications may be made in this exemplary embodiment without departing from the novel and advantageous features of this invention. For instance, although a monolithic switch-mode power supply control circuit 156 is used in the preferred embodiment, any circuit arrangement which pulse-width modulates control signal $e_1$ in accordance with the state of transistor 154 would be equally suitable. For instance, a microprocessor or discrete components could be substituted for integrated circuit 156 in order to perform control functions. Likewise, current limiting circuit 170 could be replaced with any suitable circuit arrangement which decreases the duty cycle of control signal el when excessive current is drawn from power supply 10 (for instance, remote current sensing, digital current limiting control, etc. could all be used in accordance with the present invention). The exact circuit configuration of primary circuit 12 could be varied with respect to the connections between switching transistors 46 and 48, output terminals 30 and 32 and primary winding 18 without altering the basic function of the present invention. Likewise, those skilled in the art might readily be able to devise another circuit arrangement than that used in the preferred embodiment to turn on light emitting diode 148 of opto-coupler 150 when over-voltage occurs and to turn the LED off when undervoltage occurs. Indeed, while the present invention has particular applicability to switch-mode and other power supply circuits, they should not be regarded as being limited to this application, but may find other uses in a wide variety of different control and sensing applications. ,Accordingly, all such variations and modifications are intended to be included within the scope of the following claims.

What is claimed is:

1. An apparatus for producing a regulated voltage, said apparatus comprising:
   means for producing an unregulated voltage level;
   active regulating means, connected to receive said unregulated voltage level, for producing a regulated voltage level at an output terminal thereof, said regulating means including a power input terminal for receiving power to operate said active regulating means;
   means, connected to said unregulated voltage level, for drawing current from said unregulated voltage level producing means;
   current storing means, connected to both said current drawing means and to the output terminal of said regulating means, for storing said current drawn from said unregulated voltage level producing means and for also storing current produced by said regulating means; and
   switching means for applying the current stored in said current storing means to the power input terminal of said regulating means when the amount of charge stored by said current storing means exceeds a predetermined level.

2. An apparatus as in claim 1 wherein said switching means comprises:
   sensing means for producing a signal when the voltage appearing across said current storing mean first exceeds a first predetermined level and for ceasing to produce said signal when the voltage appearing across said current storing means falls to less than a second predetermined level less than said first predetermined level; and
   pass transistor means for connecting said power input terminal to said current storing means in response to said signal produced by said sensing means.

3. A power supply comprising:
   signal supplying means for producing a signal;
   a power transformer having a primary winding and at least one secondary winding;
   switching means, connected to receive a control signal, for selectively switching said signal produced by said signal supplying means across said primary winding in response to said control signal to induce a regulated signal in said secondary winding;
   active control means, connected to said switching means, for producing said control signal, said control means having an input power terminal for receiving power to power said active control means;
   resistor means, connected to said signal supplying means, for drawing current from said supplying means;
   charge storing means, coupled to both said resistor means and said secondary winding, for storing current drawn by said resistor means and current produced by said secondary winding; and
   hysteresis switching means, connected between said charge storing means and said input power terminal of said control means, for connecting said charge storing means to said input power terminal when the amount of charge stored by said charge storing means exceeds a first predetermined level and for disconnecting said power terminal from said charge storing means when the amount of charge stored by said charge storing means falls below a second predetermined level less than said first predetermined level.

4. A supply as in claim 3 wherein said resistor means draws substantially less current than the amount of current produced by said secondary winding and the amount of current needed to continuously power said active control means.

5. A supply as in claim 3 wherein said hysteresis switching means includes:
   pass switching means, connecting between said charge storing means and said input power terminal, for connecting said charge storing means to said input power terminal when a signal level less than the level appearing across said charge storing means is applied to a control lead thereof;
   signal level dividing means, connected across said pass switching means, for producing a level proportional to the difference between the level appearing across said charge storing means and the level applied to said input power terminal;
   means for producing a reference signal level less than the signal level produced by said secondary winding; and
   control transistor means for causing current to flow through said control lead of said pass switching means when said level produced by said voltage dividing means exceeds said reference signal level.

6. A switch-mode power supply oomprising:
   means for producing an unregulated signal;
   an output terminal;
   first switching means, connected to receive said unregulated signal, for selectively applying said unregulated signal to said output terminal;
   second switching means, connected to receive said unregulated signal, for selectively applying said unregulated signal to said output terminal;
   means for producing a reference level;
   comparing means for producing a first digital logic level signal when the signal level applied to said output terminal exceeds said reference level and for otherwise producing a second digital logic level signal different from said first logic level;
   means for establishing a control level;
   digital opto-coupling means, coupled between said comparing means and said control level establishing means, for changing said control level established by said control level establishing means in response to the signal level produced by said comparing means;
   control signal producing means, connected to said control level establishing mean, for producing, at a control terminal thereof, a control signal which varies in accordance with said control level;
   first inducting means, inductively coupled to said control terminal and connected to said first switching means, for controlling the selective application of said unregulated signal by said first switching means to said output terminal in accordance with said control signal;
   second inducting means, inductively coupled to said control terminal and connected to said second switching means, for controlling the selective application of said unregulated signal by said second switching means to said output terminal in accordance with the inverse of said control signal; and
   means, inductively coupling said first and second inducting means together, for preventing said first and second switching means from applying said unregulated signal to said output simultaneously, said preventing means cooperating with charge storage properties of said first and second switching means.

7. A power supply as in claim 6 wherein:
said control signal producing means includes a power input terminal connected to receive power; and
said power supply further includes:
means for drawing current from said unregulated signal producing means,
current storing means, connected to receive current from both said current drawing means said output terminal, for storing said received current, and
third switching means for applying the current stored by said current storing means to the power input terminal of said control signal producing means when the amount of charge stored by said current storing means exceeds a predetermined level.

8. A switch-mode power supply comprising:
means for propducing an unregulated signal;
an output terminal;
first swiching means, connected to receive said unregulated signal, for selectively applying said unregulated signal to said output terminal;
second switching means, connected to receive said unregulated signal, for selectively applying said unregulated signal to said output terminal;
control means, responsive to the signal level appearing at said output terminal, for producing a control signal at a control output terminal thereof, said control means including a power input terminal for receiving power to operate said control means;
first inducting means, inductively coupled to said control output terminal, for controlling said first switching means in accordance with said control signal;
second inducting menas, inductively coupled to said control output terminal, for controlling said second switching means in accordance with the inverse of said control signal;
means, inductively coupling said first and second inducting means together, for preventing said first and second switching mean from applying said unregulated signal to said output terminal simultaneously;
meaans for drawing current from said unregulated signal producing means;
current storing means, connected to receive current form both said current-drawign means and form said output terminal, for storing said received current; and
third switching means for applying the current stored by said current storing means to the power input terminal of said control means when the amount of current stored by said current storing means exceeds a predetermined level.

9. A supply as in claim 8 wherein:
said control means includes:
means for specifying a reference signal level,
comparing means, connected to said output terminal and to said reference signal producing means, for producing a signal at a predetermined fixed level when the signal level at said output terminal exceeds said reference signal level; and
digital opto-coupling means for applying a digital signal to said control means in response to said signal produced by said comparing means,
wherein said control means includes means for varying said control signal in response to said digital signal.

10. A switch-mode power supply comprising:
means for producing an unregulated signal;
active regulating means, connected to receive a feedback signal and said unregulated signal, for regulating said unregulated signal in accordance with said feedback signal, said regulating means including a power input terminal for receiving power for operating said regulating means;
feedback means for producing sasid feedback signal, said feedback means including:
means for producing a reference signal level,
comparing means, connected to receive said reference signal level and said regulated signal, for producing a signal when the level of said regulated signal exceeds said reference signal level, and
opto-coupling means for producing said feedback signal in response to the signal produced by said comparing means;
means, connected to receive said unregulated signal, for drawing current from said unregulated signal producing means,
current storing means, connected to receive both the current drawn by said current drawing means and current produced by said regulating means, for storing current; and
first switching means, connected to said current storing means, for applying said stored current to the power input terminal of said regulating means when the amount of current stored by said current storing means exceeds a predetermined level.

11. A supply as in claim 10 wherein said active regulating means includes:
control means, responsive to said feedback signal, for applying a control signal to a control signal output terminal thereof;
second switching means connected to receive said unregulated signal for selectively connecting said unregulated signal to an output terminal;
third switching means connected to receive said unregulated signal for selectively connecting said unregulated signal to said output terminal;
first inducing means, inductively coupled to said control signal output terminal, for causing said second switching means to conduct in accordance with said control signal;
second inducting means, inductively coupled to said control signal output terminal, for causing said third switching means to conduct in accordance with the inverse of said control signal; and
means for inductively coupling said first and second inducting means together to prevent said second and third switching means from conductive simultaneously.

12. A power supply as in claim 6 wherein:
said control level estabishing means comprises:
means for storing charge, and
means for pumping charge into said charge storing means when said digital opto-coupler is in a first state and for pumping charge out of said charge storing means when said digital opto-coupler is in a second state; and
said digital opto-coupling means changes between said first and second states when said level applied to the output terminal of said comparing means changes between said first and second digital logic levels.

* * * * *